INVENTOR.
HARRISON S. BURSON, SR.
BY
West & Oldham
ATTORNEYS

June 23, 1953  H. S. BURSON, SR  2,643,118
MOVIE FILM FEEDER WITH SIMULTANEOUS
UNWINDING AND REWINDING ACTION
Filed March 23, 1950  3 Sheets-Sheet 3
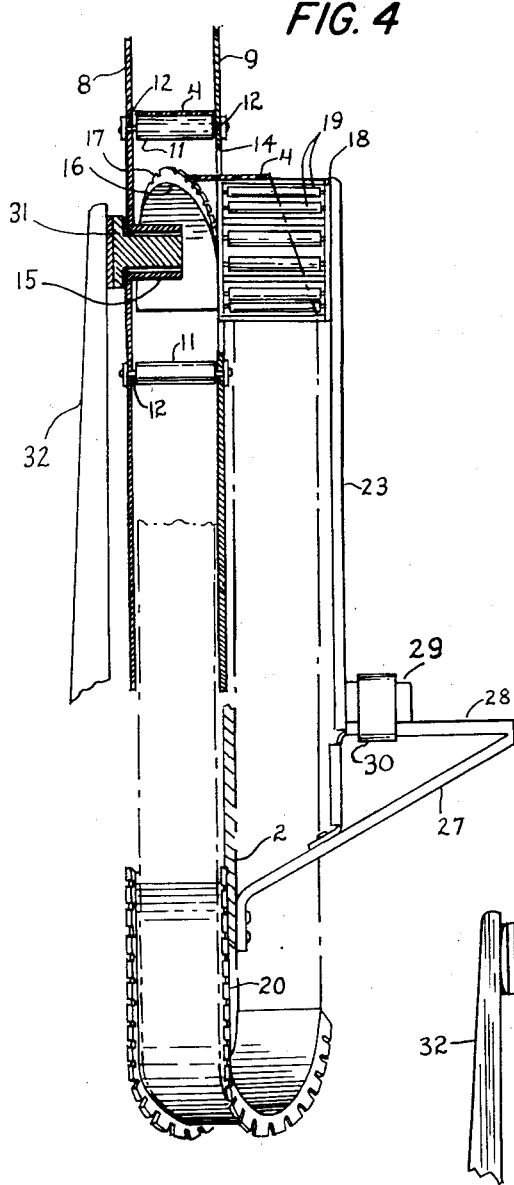
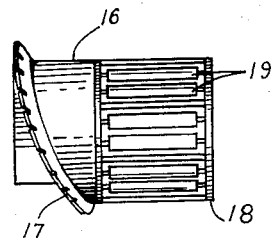
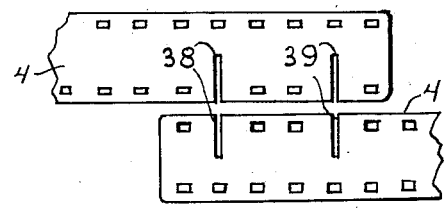
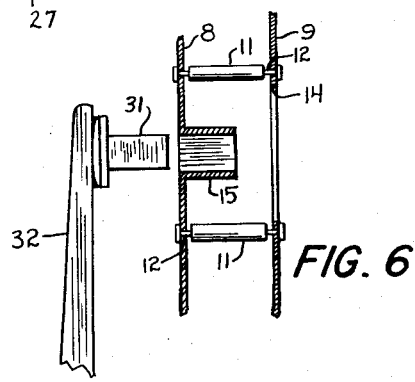
INVENTOR.
HARRISON S. BURSON, SR.
BY
west & Oldham
ATTORNEYS Patented June 23, 1953

2,643,118

UNITED STATES PATENT OFFICE 2,643,118

MOVIE FILM FEEDER WITH SIMULTANEOUS UNWINDING AND REWINDING ACTION

Harrison S. Burson, Sr., Cleveland, Ohio

Application March 23, 1950, Serial No. 151,458

2 Claims. (Cl. 271—2.18)

This invention relates to movie film projectors, especially to one which is provided with means which the movie film can be simultaneously uncoiled from a film carrying reel, be projected, and be recoiled upon the same reel as initially contained the film.

Heretofore in movie projector apparatus, it has been conventional to move the movie film from one reel to a second reel as the movie film is run through a movie projector. Thereafter it is necessary to rewind the film from the second reel onto the first before the film can be reprojected. Obviously this rewinding operation is objectionable in that it usually slows up the showing of further film, or in that it takes extra time of the operator to perform the rewinding operations and generally is inconvenient when it is desired to show the same film to the same audience. Some attempts have been made to provide special film carrying reels by which a rewinding operation could be simultaneously carried out with the unreeling action and these special reels usually have comprised a reel which had a plurality of film carrying compartments formed therein spaced along an axial center line of the multiple reel. None of such special reels have been completely satisfactory insofar as I am aware, and in all events, have never met with commercial acceptance.

The general object of the present invention is to avoid the foregoing difficulties in rewinding or re-reeling movie film after it has been run through a projector and to provide a projector which is characterized by its ability to effect a simultaneous uncoiling and recoiling action of movie film on the same reel as the film is being run through a movie projector.

Another object of the invention is to provide a movie projector apparatus which can be continuously operated on movie film with such film being formed into the shape of an endless loop in the movie projector.

Another object of the invention is to provide a special type of a movie film receiving reel which is of conventional size and is adapted to simultaneously receive film in the outer portion thereof and to unwind film stored in convolutions on the reel from the radially inner surface of the reel.

Yet a further object of the invention is to provide a relatively uncomplicated, inexpensive, sturdy apparatus that can be relatively readily secured to conventional movie projectors to adapt them to perform simultaneous winding and unwinding actions on a movie film carried by a unitary reel.

Another object of the invetnion is to provide certain roller support means for film on a film carrying spool whereby relative rotation can be produced between convolutions of movie film on the reel and the reel itself.

Still another object of the invention is to provide means for positively effecting a rotation between a plurality of convolutions of movie film on a reel and the reel.

Further objects of the invention are to position a movie carrying reel laterally displaced from the projection plane of a movie projector; to provide a retractible guide member which can be associated with or removed from engagement with a film carrying reel of a projector device to displace a film laterally; to provide a plurality of guide means for effecting lateral displacement of a movie film upon relative movement of the guide and film; to provide a movie film the ends of which are adapted to be secured together removably to form an endless loop of film; to provide a film receiving reel which can be supported from only one side thereof; and to provide film guide means for association with the center portion of a reel from one side of the reel.

The foregoing and other objects and advantages of the invention will be made more apparent as the specification proceeds.

Attention is now directed to the accompanying drawings, wherein:

Fig. 4 is an enlarged elevation, partially in section, taken from the rear of a projector and showing only the film carrying means of the projector;

Fig. 5 is an elevation of one of the film guide means of the invention;

Fig. 6 is an exploded view showing the film receiving reel hub and the support provided therefor in the device of the invention; and Fig. 7 is a plan view showing the ends of a film and how they can be secured together to form a loop from a strip of film.

Figure 1:
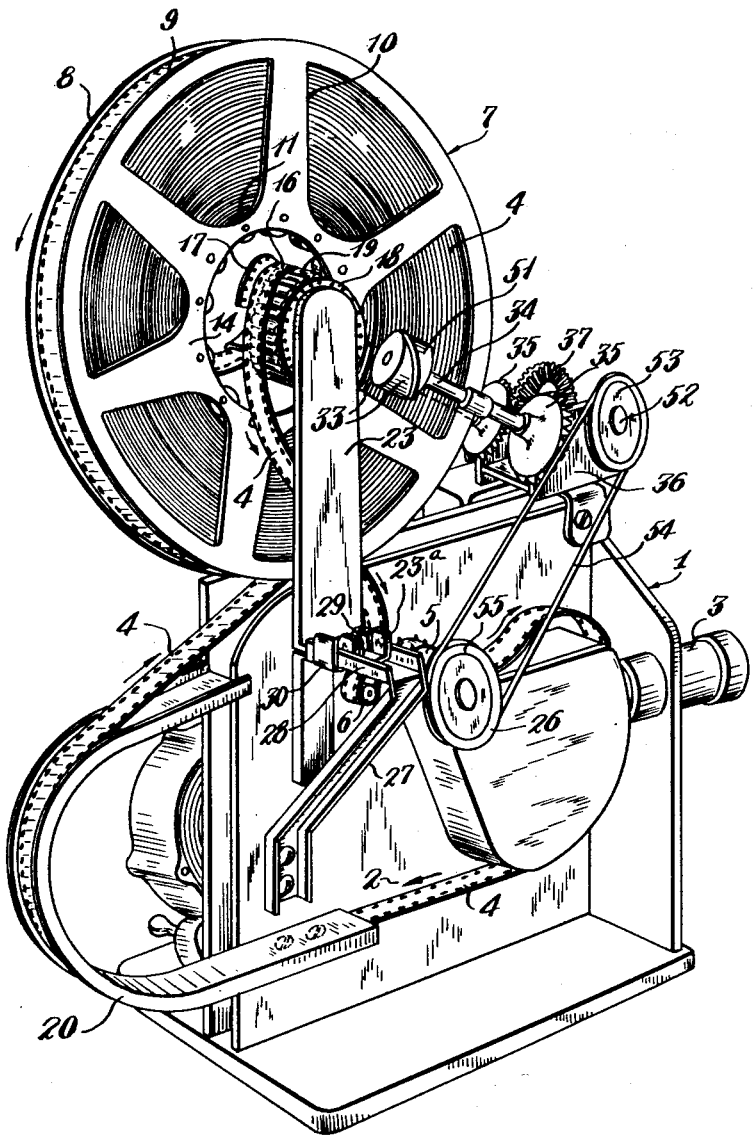
Fig. 1 is a perspective view of a movie projector and reel embodying the principles of the present invention.
Figure 2:
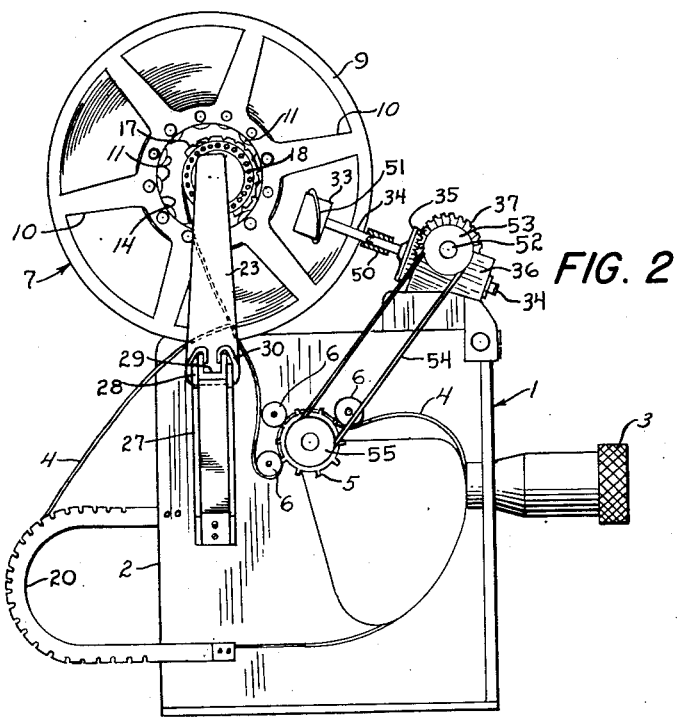
Fig. 2 is a side elevation of the projector of Fig. 1.
Figure 3:
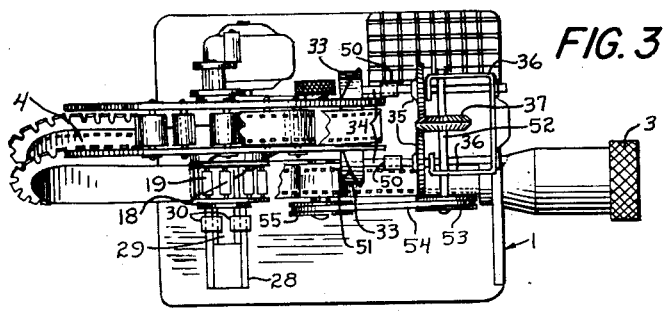
Fig. 3 is a plan view of the projector of Fig. 1.

The present invention, broadly speaking, may be said to comprise the provision of a movie film reel which has a support hub at the center thereof, and a plurality of circumferentially spaced annularly positioned roller devices which form a film supporting hub on the reel at an appreciable radial distance from the center support hub of the reel whereby film convolutions carried by the reel can be readily rotated with relation to the reel and whereby film can be withdrawn from the reel intermediate the circumferentially spaced rollers at the film support hub of the reel, one side, of the reel being open at the center thereof for withdrawal of film. The invention further comprises the provision of guide means for laterally displacing film from a film support reel for the purpose of passing such film through a movie projector apparatus after which the film is again laterally displaced over to the plane of the film support reel for rewinding on the periphery thereof simultaneously with the unwinding of the film from the film carrying hub portion of the film reel.

Reference is now directed to the details of the structure shown in the drawings and in this instance the projector apparatus of the invention is referred to generally by the numeral 1. This apparatus includes a conventional projector device of substantially any conventional form and it includes a projector frame 2 on which is positioned a suitable lens 3 before which a movie film 4 is to be drawn. This film 4 is adapted to be pulled over a driven sprocket 5 which has teeth thereon for engaging with holes formed in the sides of the film 4 with the film being led to and from the sprocket 5 over a plurality of guides 6 which aid the film 4 in moving through the projection apparatus of the invention, as such film passes to and from the association with the lens 3.

An important element of the present invention is that a special type of a film receiving reel 7 is provided which reel may include a pair of sides or side discs 8 and 9 each of which have a plurality of relatively large holes or apertures 10 formed therein. The side discs 8 and 9 may be secured together in any conventional manner and a plurality of rollers 11 are shown as being journaled on pins 12 which are suitably secured to and extend between the sides 8 and 9 and which may be used to position the sides in fixed but spaced parallel relationship. It will be noted that the rollers 11 are positioned in circumferentially spaced relationship in an annular section in the reel 7 which is spaced appreciably from both the center and radially outer portions of the reel 7 so that a film receiving or supporting hub is provided by the rollers 11.

Fig. 1 of the drawings best shows that the side 9 has a relatively large opening, or aperture 14 formed therein, which opening usually extends completely between the ring defined by the rollers 11. In contrast to the side 9, the side 8 has a more or less solid center portion and it is provided with a shaft-receiving hub 15 which protrudes axially inwardly of the reel 7 from the side 8 and may be formed integrally therewith, if desired. This hub 15 is of irregular shape in cross-section and normally will comprise a substantially square section since it is desired that the reel 7 be fixedly and non-rotatably positioned on a support member, as will hereinafter appear.

By the reel construction described, it is possible to thread a portion of the film 4 through one of the circumferential gaps between some of the rolls 11 whereby an unreeling or unwinding action or pull may be exerted on the film 4 so that it can be drawn from the radially innermost member of the plurality of convolutions of film formed on the reel 7. Complete disassociation of the film 4 and the reel 7 is facilitated by the use of an arcuate guide 16, Figs. 4 and 5, which is made in the shape of a portion of a helix. This guide 16 may be formed from a strip of sheet metal which has only one guide channel or flange 17 formed thereon. This flange 17 is on the lateral margin of the guide which is axially innermost, or within the reel 7 so that longitudinal movement of the film 4 over the guide 16 will urge the film 4 laterally of itself and facilitate further movement and use of such film in accordance with this invention. Normally the guide 16 is slightly over 180 degrees in length and is secured to, on the axially outer portion thereof, a cage 18 that has a plurality of rollers 19 journaled thereon and forming a peripheral contact surface therefore. A film strip moving over the guide 16 will be deposited on the rollers 19 on the cage 18 and will readily and easily pass thereover due to the low friction between the film strip and the roller means. From the rollers 19, the film 4 next progresses to one of the guides 6 for movement of the film through the projector device of the invention in a conventional manner.

In order to return film after it has passed through or in front of the lens 3 back to the reel 7 for deposit thereon, a second guide 20 is suitably secured to the projector frame 2 for receiving film after it passed in front of the lens. This guide 20 is shown as comprising a channel member which is substantially of semi-oval shape and which may have a pair of edge flanges provided thereon for receiving the film strip 4 therebetween but for effecting a lateral displacement of such film strip as it passes over and along the length of the guide 20.

So that the reel 7 can be assembled into and removed from association with the apparatus 1, I preferably provide a slide support for an arm 23 on which the cage 18 is positioned. The support for the arm 23 is shown as comprising a bracket 27 that is suitably secured to the projector frame 2 and has a substantially horizontally directed upper channel 28 provided thereon. A foot portion is provided on the support arm 23 and is indicated at 29. A slider 30 is engaged with both the foot portion 29 of the support arm 23 and with the channel 28 whereby the support arm is fixedly carried by such channel 28 but is slidable therealong whereby the guide 16 and associated means can be telescoped into or out of axial association with the reel 7 as it is positioned on the projector frame 2.

The reel 7 is carried by a support 31, which may comprise a stud substantially square in section and carried by a support bracket 32 that is suitably secured to and protrudes from the projector frame 2.

Fig. 1 best shows that a pair of rollers 33, which are of substantially cylindrical shape, are secured to individual supporting roller shaft 34 each of which is provided with a bevel gear 35 spaced appreciably from the roller 33 that is carried at the end of the shaft. The remaining end of each of the roller shafts 34 may be journaled in and be supported by housings 36 that are supported on the projector frame 2 on opposite sides thereof. A sleeve 50 is in removable telescoped engagement with the joint in one shaft 34 that is usually formed of two pivotally associated sections to lock them in fixed relation but to enable one roller to be swung out away from the projector frame in order to permit the reel 7 to be readily associated with or removed from engagement with the remainder of the apparatus. Fig. 1 also shows that each of the bevel gears 35 engages with an opposite surface of a driven gear 37 that is suitably journaled in the projector frame 2 at an upper portion thereof and protrudes therefrom for engagement with the gear 35. These rollers 33 are so positioned and adapted so that they will engage resiliently with opposed lateral portions of the reel 7 and will in turn extend through the apertures 10 provided in this reel to engage with the convolutions of the film 4 that are formed on the reel 7. The rollers 33 may be made from any suitable material and usually are somewhat resilient or flexible and may be made from rubber or rubber-like material whereby they will not have any abrasive action on the film 4 and will exert sufficient force thereon to drive the convolutions of film as a unit and facilitate movement of film form the innermost convolutions thereof. The rollers 33 each usually have a continuous rib 51 formed thereon and lying in a plane which is inclined at approximately 45° to the axis of the roller. The rollers are rotated in a direction to urge convolutions of film radially inwardly of the reel 7.

Gear 37 is carried by a shaft 52 journaled by and extending between the housings 36. A pulley 53 is secured to one end of the shaft 52 and engages a belt 54 that engages a driven pulley 55.

In order to utilize the apparatus of the invention to best efficiency, it is desirable that an endless loop be formed in the film 4. To this end, each end of the film is provided with a pair of slots 38 and 39 formed in a lateral portion thereof. Each of the slots 38 extends into the film substantially half the width thereof from opposite sides of the film whereas the other slots 39 are equally spaced from the slots 38 and are correspondingly formed in the film whereby the end portions of the film can be telescoped laterally into engagement with each other by engaging the slots 38 with each other and the slots 39 with each other and having one portion of the film 4 overlying the film strip intermediate the slots 38 and 39 and being underneath the other film portion at other longitudinal sections of the film.

It is thought that the film is more or less continuously advancing in the convolutions formed thereof on the reel since equal lengths of film move from the innermost convolution and are applied to the outermost convolution regardless of the difference in diameter of the convolutions.

The drive provided by the rollers 33 is usually sufficient to force or move the film in the innermost convolution from the reel 7 but this action is at least facilitated by the drive of the sprocket 5 that moves the film past the projection lens.

From the foregoing, it will be seen that means have been provided for withdrawing film from a film carrying reel on the radially inner surfaces thereof, and that the convolutions of film on the reel can be positively rotated with relation to the film carrying reel, if desired. Furthermore, a special reel having desirable operative properties has been provided. This apparatus is relatively inexpensive and with a few minor adjustments could be adapted for use with conventional types of movie projectors. Set screws (not shown) may retain the sleeves 50 in given positions. Of course, the reel 7 is stationarily positioned on the stud 31.

It is submitted that the objects of the invention have been achieved and that a novel reel has been provided for uncoiling and rewinding convolutions of movie film simultaneously from a unitary film positioning reel which is of conventional size and shape.

While one complete embodiment of the invention has been disclosed herein, it will be appreciated that modification of this particular embodiment of the invention may be resorted to without departing from the scope of the invention as defined by the appended claims.

Having thus described my invention what I claim is:

1. In a movie projector, a frame, a stud shaft on said frame, an arcuate channeled guide of helical shape, said guide being in encompassing relation to said shaft, a support arm carrying said guide, means slidably supporting said support arm for telescoping movement of said guide into and out of encompassing relation with said shaft, a reel positioned on said shaft and being retained stationarily thereon, said reel having a plurality of apertures in the sides thereof, said reel having a support hub at the center thereof and a film support hub radially spaced from said support hub, said film support hub comprising a plurality of circumferentially spaced rollers, said guide being inserted between said hubs of said reel, means for pulling film on said reel therefrom radially inwardly from the support hub thereof and pulling it over said guide, and a pair of driven resilient roller means carried by said frame and extending therefrom for extending through apertures in opposed sides of said reel and rotating any convolutions of film on said reel with relation thereto.

2. In a movie projector, a frame, a shaft on said frame, an arcuate channeled guide of helical shape, said guide being in encompassing relation to said shaft, means carrying said guide and permitting telescoping movement of said guide into and out of encompassing relation with said shaft, a reel positioned on said shaft and having a plurality of apertures in the sides thereof, said reel having a support hub at the center thereof and a film support hub radially spaced from said support hub, said film support hub comprising a plurality of circumferentially spaced rollers, said guide being inserted between said hubs of said reel, and a pair of driven roller means for extending through apertures in opposed sides of said reel and rotating any convolutions of film on said reel with relation thereto.

HARRISON S. BURSON, Sr.

References Cited in the file of this patent

UNITED STATES PATENTS

| Number | Name | Date |
|---|---|---|
| 1,267,411 | Howell | May 28, 1918 |
| 1,499,941 | Marette | July 1, 1924 |
| 1,580,180 | Derhoef | Apr. 13, 1926 |
| 2,325,563 | Westerkamp | July 27, 1943 |
| 2,327,108 | Heyer | Aug. 17, 1943 |
| 2,341,313 | Chedister | Feb. 8, 1944 |
| 2,363,403 | Napoli | Nov. 21, 1944 |
| 2,419,961 | Links | May 6, 1947 |
| 2,436,032 | Benfelt | Feb. 17, 1948 |
| 2,464,965 | Chemel | Mar. 22, 1949 |